US011989145B2

(12) United States Patent
Hellwig et al.

(10) Patent No.: US 11,989,145 B2
(45) Date of Patent: May 21, 2024

(54) WRITE BUSY SIGNALING FOR INTERFACE STRUCTURES

(71) Applicant: Infineon Technologies AG, Neubiberg (DE)

(72) Inventors: Frank Hellwig, Wunstorf (DE); Glenn Ashley Farrall, Long Ashton (GB); Darren Galpin, Bristol (GB); Sandeep Vangipuram, Bristol (GB)

(73) Assignee: Infineon Technologies AG, Neubiberg (DE)

( * ) Notice: Subject to any disclaimer, the term of this patent is extended or adjusted under 35 U.S.C. 154(b) by 14 days.

(21) Appl. No.: 17/671,031

(22) Filed: Feb. 14, 2022

(65) Prior Publication Data

US 2023/0259471 A1    Aug. 17, 2023

(51) Int. Cl.
*G06F 13/362* (2006.01)
*G06F 13/40* (2006.01)

(52) U.S. Cl.
CPC ........ *G06F 13/362* (2013.01); *G06F 13/4031* (2013.01); *G06F 13/404* (2013.01); *G06F 13/4045* (2013.01)

(58) Field of Classification Search
CPC ............... G06F 13/1605; G06F 13/362; G06F 13/4031; G06F 13/404; G06F 13/4045
See application file for complete search history.

(56) References Cited

U.S. PATENT DOCUMENTS

| 2015/0137839 A1* | 5/2015 | Jones | G01R 31/00 324/750.01 |
| 2019/0095117 A1* | 3/2019 | Park | G06F 3/061 |
| 2022/0012196 A1* | 1/2022 | Lee | G06F 3/0683 |

OTHER PUBLICATIONS

Infineon Technologies AG "AURIX TC3xx" Published Feb. 2021.

* cited by examiner

*Primary Examiner* — Brian T Misiura
(74) *Attorney, Agent, or Firm* — Eschweiler & Potashnik, LLC

(57) ABSTRACT

Some examples relate to a method. In the method, a write transaction is routed from a master device to a slave device through a communication path. The communication path includes a first bridge and a second bridge downstream of the first bridge. The first bridge and the second bridge are coupled to one another via an interface structure. The first bridge sets a write busy signal on the communication path when the write transaction is processed by the first bridge; and in response to the first bridge setting the write busy signal, the second bridge holds the write busy signal until the write transaction has been received by the slave device. Upon the slave device receiving the write transaction, the second bridge resets the write busy signal to propagate the reset write busy signal back to the master device through the first bridge.

20 Claims, 9 Drawing Sheets

1000

```
┌─────────────────────────────────────────────────────────────────┐
│ Routing a write transaction from a master device to a slave     │
│ device through a communication path including a first bridge    │── 1002
│ and a second bridge downstream of the first bridge, wherein     │
│ the first bridge and the second bridge are coupled to one       │
│ another via an interface structure                              │
└─────────────────────────────────────────────────────────────────┘
                                │
                                ▼
┌─────────────────────────────────────────────────────────────────┐
│ Wherein the first bridge sets a write busy signal on the        │
│ communication path when the write transaction is processed by   │
│ the first bridge; and in response to the first bridge setting   │── 1004
│ the write busy signal, the second bridge holds the write busy   │
│ signal set until the write transaction has been correctly       │
│ received by the slave device                                    │
└─────────────────────────────────────────────────────────────────┘
                                │
                                ▼
┌─────────────────────────────────────────────────────────────────┐
│ Upon the slave device correctly receiving the write transaction,│
│ the second bridge resets the write busy signal to propagate the │── 1006
│ reset write completion signal back to the master device through │
│ the first bridge                                                │
└─────────────────────────────────────────────────────────────────┘
```

Fig. 10

WRITE BUSY SIGNALING FOR INTERFACE STRUCTURES

FIELD

The present disclosure relates in general to integrated circuits, and more particularly, to bus systems for integrated circuits.

BACKGROUND

Moore's law is a concept in the world of electronics that states the number of transistors on an integrated circuit (IC) doubles approximately every two years. Because of Moore's law, ICs include more and more functionality with each successive generation. For example, while several decades ago an IC may have consisted of a single arithmetic logic unit (ALU), today's ICs can include significant amounts of memory, multiple microprocessors (each providing more functionality than a single ALU), and an entire suite of peripherals to provide system level functionality from a single IC.

Bus structures, which are essentially a series of wires running between the memory, microprocessors, and peripherals on the IC, allow the various devices to communicate with one another in an efficient way.

BRIEF DESCRIPTION OF THE DRAWINGS

FIG. 10 illustrates a method in flow chart format in accordance with some embodiments.

DETAILED DESCRIPTION

Figure 1:
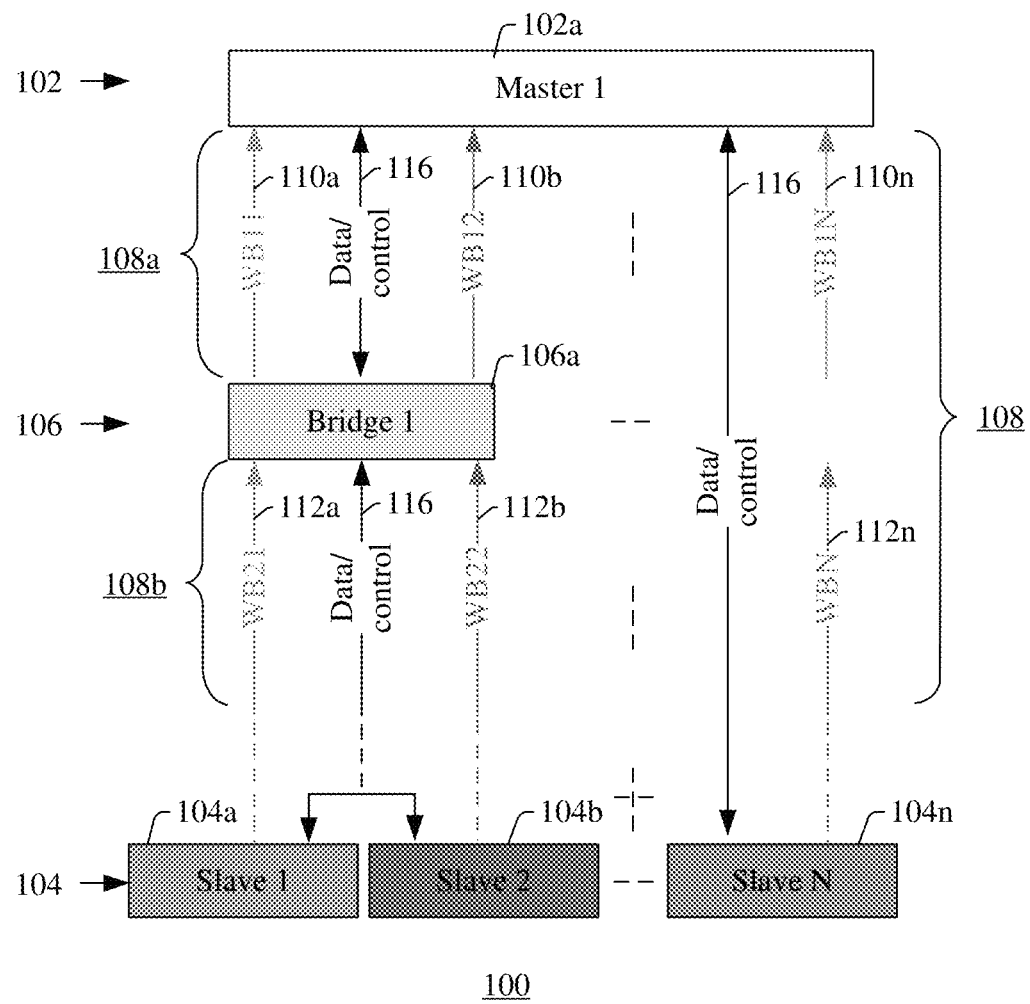
FIG. 1 illustrates a system including an interface structure in accordance with some embodiments.
Figure 4:
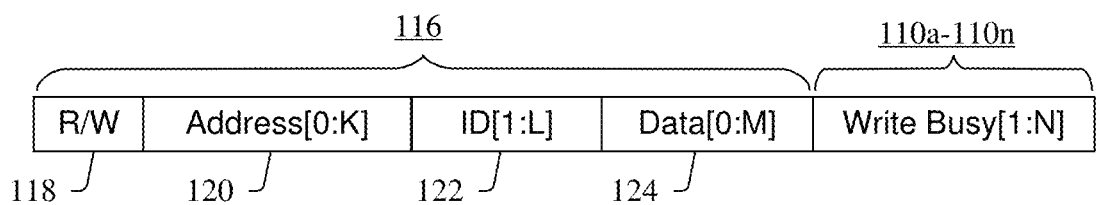
FIG. 4 illustrates data/control bus lines and write busy bus lines of an interface structure in accordance with some embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware.

Compared to previous technology nodes, modern integrated circuit systems include more components, such as memory, microprocessors, and peripherals. These components can be grouped into master devices and slave devices, wherein the master devices control the slave devices. As systems include greater numbers of master devices and slave devices, the master devices and slave devices can be coupled to one another via a communication path that includes one or more interface structures. These interface structures provide for a wide range of operable coupling between the various master devices and slave devices. In some cases, the interface structures may include cross-bar bus structures that allow a selected input to be switched to a selected output. In other instances, the interface structures may represent interconnections to route signals from one part of the integrated circuit system to others. A plurality of such interface structures may be provided between master device and slave device, in some cases interface structures and bridges alternate along the communication path from master device to slave device. However, the interface structures can also contribute to long delays for read transactions and/or write transactions between the various devices. These long delays lend themselves to a possibility for data being processed out of order or in an otherwise untimely manner, absent adequate safeguards. For example, on an integrated circuit where various master devices are each in communication with various slave devices via one or more levels of interface structures, if a master device requests a write transaction to write data to a slave device and issues an interrupt when the write transaction has been approved by the slave device, in some cases the interrupt can be serviced before the data is fully written to the slave device. This issue can also arise for systems with a single-level interface structure, but because delay can be exaggerated by additional levels of interface structures and/or bridge devices on the communication path, this issue potentially becomes more pronounced as additional levels of interface structures are included in a system.

Accordingly, some aspects of the present disclosure provide for interface structures that include improved signaling techniques. These techniques make use of write busy signals that are provided on dedicated write busy bus lines on the interface structures. The write busy signals are asserted and de-asserted in a manner to help mitigate and/or prevent synchronization issues in the system.

Figure 2:
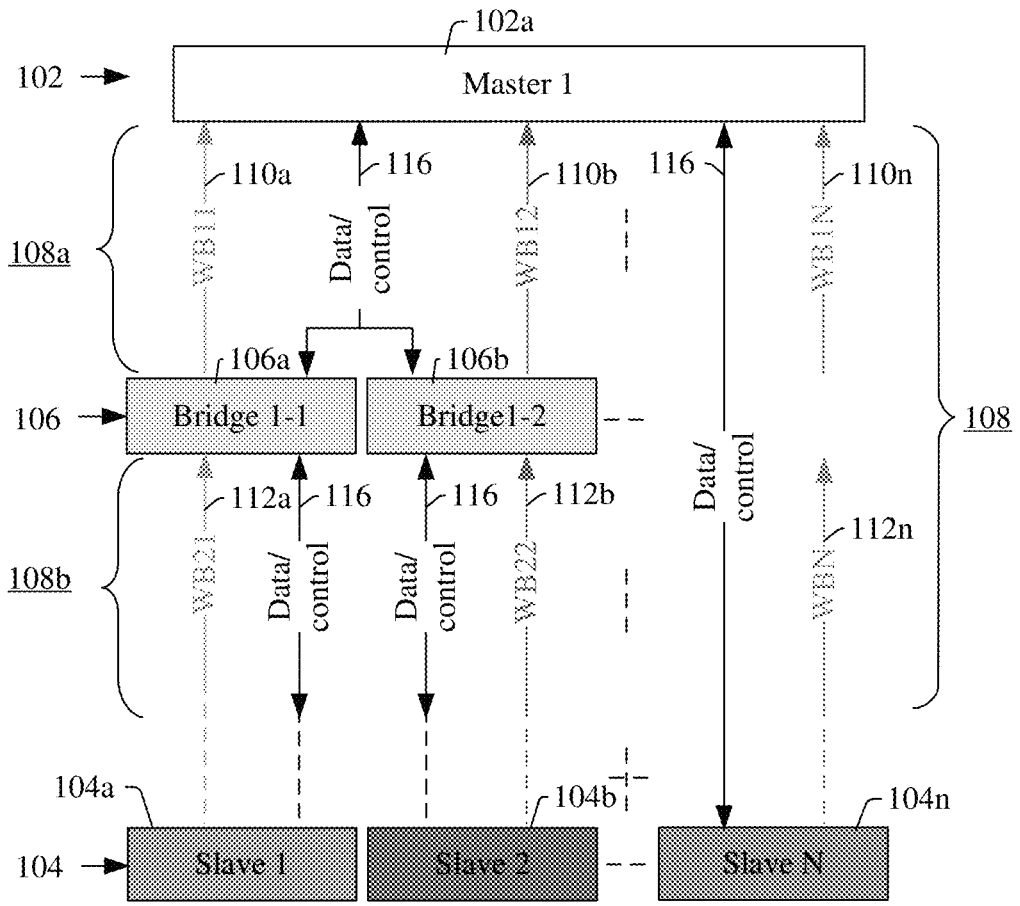
FIG. 2 illustrates a system including an interface structure in accordance with some embodiments.
Figure 3:
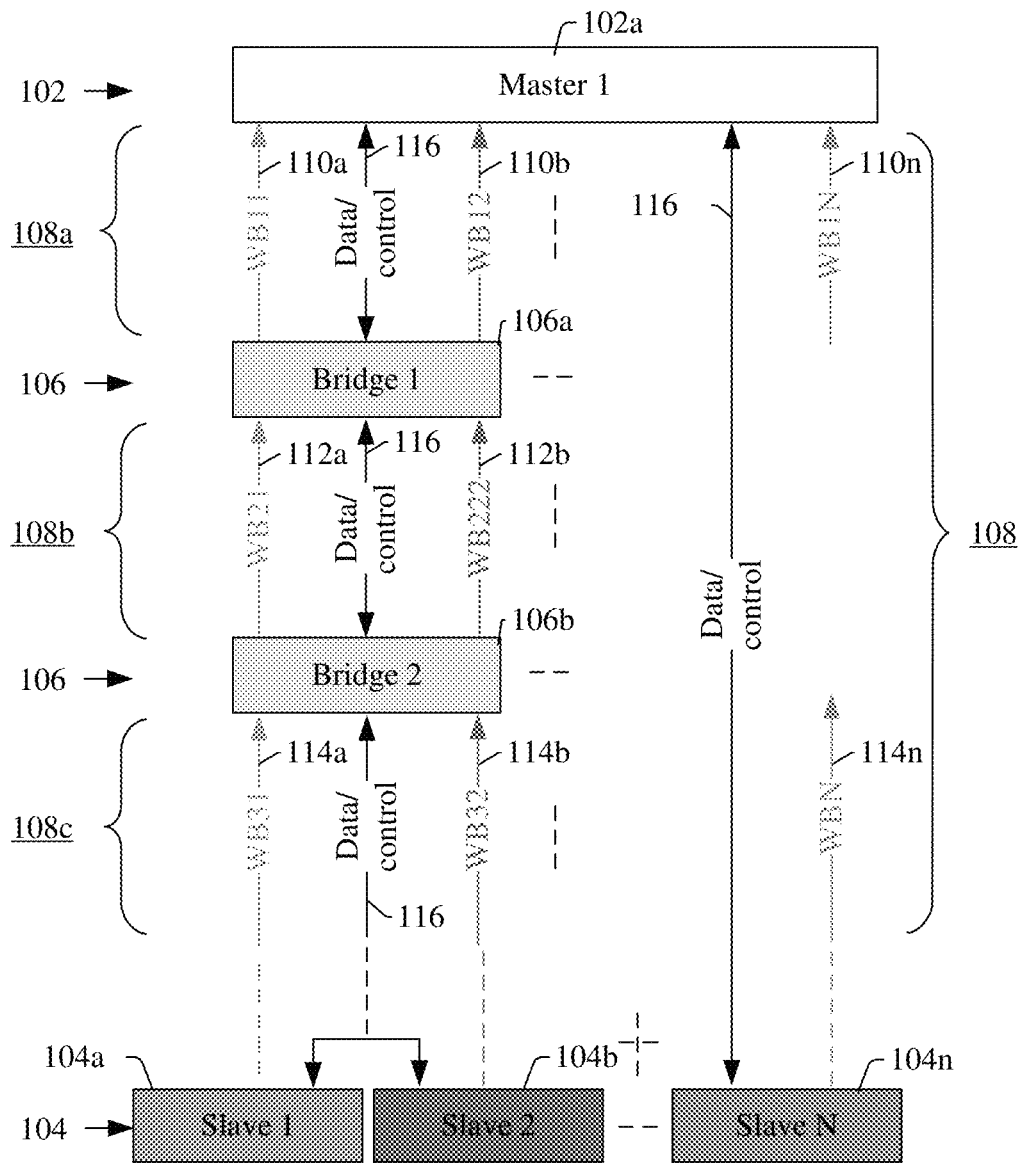
FIG. 3 illustrates a system including an interface structure in accordance with some embodiments.

Referring briefly to FIG. 1-3 collectively, one can see several examples of systems 100-300 that include interface structures 108 to facilitate communication between one or more master devices 102 (e.g., master device 102a) and N slave devices 104, where N is any positive integer. Bridge devices 106 are arranged between the master devices 102 and slave devices 104, and the interface structures 108 (which can include a first interface structure 108a, second interface structure 108b, and so on) couple the master device 102, slave devices 104, and bridge devices 106, as shown. N write busy bus lines (e.g., 110a-110n) are provided to the master device 102 and carry N write busy signals, respectively, indicating when the N slave devices (104a-104n), respectively, have received a write transaction. These write busy signals are asserted and de-asserted in a manner to notify the master device 102 when the respective slave devices have accepted a write transaction, and thereby help to mitigate and/or prevent synchronization issues.

It will be appreciated that for purposes of clarity and understanding, FIGS. 1-3 each illustrate a single master device 102, N slave devices 104, and a limited number of bridge devices 106. However, in general any number of master devices, slave devices, and/or bridge devices can be present on an IC with interface structures and/or other bus structures coupling the various bridge devices and/or master devices and/or slave devices to one another. Further, the bridge devices can be organized into any number of bridge device levels that are present between master device(s) and slave device(s), with any number of bridge devices present in each bridge device level. Typically, a master device receives N write busy bus lines, wherein the N write busy bus lines correspond in one-to-one fashion with the N slave devices, respectively. Thus, FIGS. 1-3 are merely illustrative of a few example systems, and will be used to describe improved signaling techniques, but it will be appreciated that these example systems are not limiting, nor are additional examples later described with regards to more detailed figures discussed further herein.

Referring now to FIG. 1, system 100 includes a master device 102a configured to communicate with N slave devices 104a, 104b, . . . , 104n. A first interface structure 108a couples the master device 102 to a first bridge device 106a (and optionally additional bridge devices—not shown—in parallel with the first bridge device 106a). A second interface structure 108b couples the first bridge device 106a to a first slave device 104a and a second slave device 104b. The first interface structure 108a includes a first first-interface write busy line (WB11) 110a, and the second interface structure 108b includes a first second-interface write busy line (WB21) 112a—wherein both of these write busy lines WB11 110a and WB21 112a correspond to the first slave device 104a. The first interface structure 108a also includes a second first-interface write busy line (WB12) 110b, and the second interface structure 108b also includes a second second-interface write busy line (WB22) 112b—wherein both of these write busy lines WB12 110b and WB22 112b correspond to the second slave device 104b.

To provide a first write request to the first slave device 104a (and to provide other write requests to other devices in the system), the first interface structure 108a includes a set of data/control bus lines 116 that are physically separate/distinct from the interface write busy lines 110a, 110b, . . . , 110n. Referring briefly to FIG. 2, one can see an example of an interface structure that includes data/control bus lines 116 and separate write busy lines (e.g., 110a-110n). For the data/control bus lines 116, the interface structure includes a read-write (R/W) bus line 118, a series of K address bus lines 120, a series of L identification (ID) bus lines 122, and M data bus lines 124. K, L, and M are integers which can be the same as one another but are typically different from one another, and $2^K$ corresponds to an address space available to devices on the bus structure. The read-write bus line 118 transmits a control bit that indicates whether a given bus transaction is a read or write transaction, and the address bus lines 120 indicate a target address for a given read or write transaction (e.g., an address of a master device or slave device) and thus are mapped to the various master devices and slave devices and other devices in the system. The identification (ID) bus lines 122 carry a module ID that uniquely identifies each master device and slave device from which a write transaction originates and/or to which a write transaction is sent, and the data bus lines 124 dictate the data to be transferred to and/or from the various master devices and slave devices. In some cases, the data/control bus lines 116 can be the same set of lines extending through each level of interface structure in FIGS. 1-3 and other systems illustrated and/or described herein.

Referring back to FIG. 1, upon the master device 102a requesting a first write request to the first slave device 104a over the data/control bus lines 116, the first bridge device 106a is configured to assert the first first-interface write busy line (WB11) 110a. Further, upon the first slave device 104a accepting the first write request, the first slave device 104a is configured to trigger de-assertion of the first second-interface write busy line (WB21) 112a. In response to the de-assertion of the first second-interface write busy line (WB21) 112a, the first bridge device 106a is configured to de-assert the first first-interface write busy line (WB11) 110a. Because the first bridge device 106a continuously asserts the first first-interface write busy line 110a until the first second-interface write busy line 112a is de-asserted, the master device 102a is able to accurately determine when the first slave device 104a has actually received the first write request by evaluating the state on the first first-interface write busy line WB11 110a. Thus, the system 100 can avoid synchronization issues between the first slave device 104a and other devices on the chip.

Similarly, upon a second write request from the master device 102a to the second slave device 104b through the first bridge device 106a, the first bridge device 106a is configured to assert the second first-interface write busy line (WB12) 110b. Further, upon the second slave device 104b accepting the second write request, the second slave device 104b is configured to trigger de-assertion of the second second-interface write busy line (WB22) 112b; and, in response to the de-assertion of the second second-interface write busy line (WB22) 112b, the first bridge device 106a is configured to de-assert the second first-interface write busy line (WB12) 110b. Thus, the master device 102a is able to accurately determine when the second slave device 104b has actually received the second write request by evaluating the state on the second first-interface write busy line 110b, and thereby can avoid synchronization issues between the second slave device 104b and itself and/or other devices on the chip.

In this way, upon an interrupt, semaphore, or other synchronization event occurring in the system 100, the system can evaluate the write busy lines 110a-110n (e.g., as part of the interrupt service routine or other mechanisms) to determine whether the slave devices 104a-104n have a write transaction pending. If a write transaction is still pending (e.g., if corresponding write busy line 110a-110n is still asserted), the system can take appropriate action (e.g., wait additional time until the corresponding write busy lines are de-asserted) to mitigate and/or prevent synchronization issues in the system. Thus, the addition of the write busy lines 110a-110n above and beyond the data/control bus lines 116 helps mitigate and/or prevent synchronization issues in larger integrated circuits with interface structures.

FIG. 2 illustrates another system 200 that is similar in some regards to FIG. 1, wherein similar elements are identified by corresponding reference numbers. Like FIG. 1's system, FIG. 2's system again includes a master device 102a that is coupled to one or more slave devices 104 via an interface structure 108. However, whereas the interface structure 108 in FIG. 1 included a single first bridge device 106a coupling the master device 102a to the first slave device 104a and second slave device 104b, the interface structure 108 in FIG. 2 includes two first level bridge devices (e.g., first bridge device 106a and second bridge device 106b). Thus, in FIG. 2, the first bridge device 106a couples the master device 102a to a first slave device 104a, and the second bridge device 106b couples the master device 102a to a second slave device 104b without going through the first bridge device 106a. In this case, the first and second bridge devices 106a, 106b are both coupled to the master device 102a via a single set of data/control bus lines 116, but separate data/control bus lines 116 extend from the first and second bridges to the first and second slave devices, and separate write busy lines 110a, 110b return from the first and second bridge devices 106a, 106b, respectively. Thus, a first first-interface write busy line 110a, which corresponds to the first slave device 104a and which is de-asserted based on a first second-interface write busy line 112a, is provided from the first bridge device 106a to the master device 102a. Similarly, a second first-interface write busy line 110b, which corresponds to the second slave device 104b and which is de-asserted based on a second second-interface write busy line 112b, is provided from the second bridge device 106b to the master device 102a. This arrangement again helps to limit and/or prevent synchronization issues in the system.

In FIG. 3 the system 300 includes two levels of bridge devices, wherein a first bridge device 106a is coupled to the master device 102a, and a second bridge device 106b couples the first bridge device 106a to the first and second slave devices 104a, 104b. Thus, a first interface structure 108a couples the master device 102a to the first bridge device 106a, a second interface structure 108b couples the first bridge device 106a to the second bridge device 106b, and a third interface structure 108c couples the second bridge device 106b to the first and second slave devices 104a, 104b. Each interface structure again includes data/control bus lines 116 as well as separate write busy lines.

In FIG. 3, the third interface structure 108c includes a first third-interface write busy line (WB31) 114a and a second third-interface write busy line (WB32) 114b. When the master device 102a requests a first write transaction to the first slave device 104a via the first bridge device 106a, the first bridge device 106a asserts the first first-interface write busy line WB11 110a, indicating a write transaction is pending for the first slave device 104a. This first first-interface write busy line WB11 110a remains continuously asserted until the first slave device 104a accepts the first write request, which triggers de-assertion of the first third write busy line 114a and in turn triggers the second bridge device 106b to de-assert the first second-interface write busy line 112a, which in turn triggers the first bridge device 106a to de-assert the first first-interface write busy line 110a to safely notify the master device 102a that the first slave device 104a has accepted the first write transaction. Similarly, upon the master device 102a requesting a second write transaction to the second slave device 104b via the first bridge device 106a, the first bridge device 106a asserts the second first-interface write busy line WB12 110b, indicating a write transaction is pending for the second slave device 104b. Upon the second slave device 104b accepting the second write request, the second slave device 104b is configured to trigger de-assertion of the second third-interface write busy line (WB32) 114b, which in turn triggers the second bridge device 106b to de-assert the second second-interface write busy line (WB22) 112b, which in turn triggers the first bridge device 106a to de-assert the second first-interface write busy line (WB12) 110b to safely notify the master device 102a that the second slave device 104b has accepted the second write transaction. In this way, the write busy lines 110a-110n, 112a-112n, 114a-114n again help to limit and/or prevent synchronization issues in the system.

It will be appreciated that although FIGS. 1-3 show several basic configurations, these configurations can be combined with one another in any number of ways and can also include other features to realize improved interface signaling techniques. In these illustrated embodiments and other embodiments, typically the master device(s) 102, slave device(s) 104, and bridge device(s) 106 are disposed in a single integrated circuit package, but could also be spread over multiple integrated circuit packages. Thus, the master device(s), bridge device(s), and slave device(s) can be disposed on a single die that includes a monocrystalline silicon substrate, wherein transistors of the various devices disposed in the substrate and are coupled together though an interconnect structure typically made of copper metal lines arranged in a dielectric structure over the monocrystalline silicon substrate. In other embodiments, the master device(s), bridge device(s), and slave device(s) can be spread over multiple dies within a three-dimensional integrated circuit (3DIC) wherein interconnect structures over the various semiconductor substrates and/or through substrate vias couple the various devices to one another in the 3DIC, and are encapsulated by a packaging material such as ceramic, plastic, or other protective material.

Figure 5:
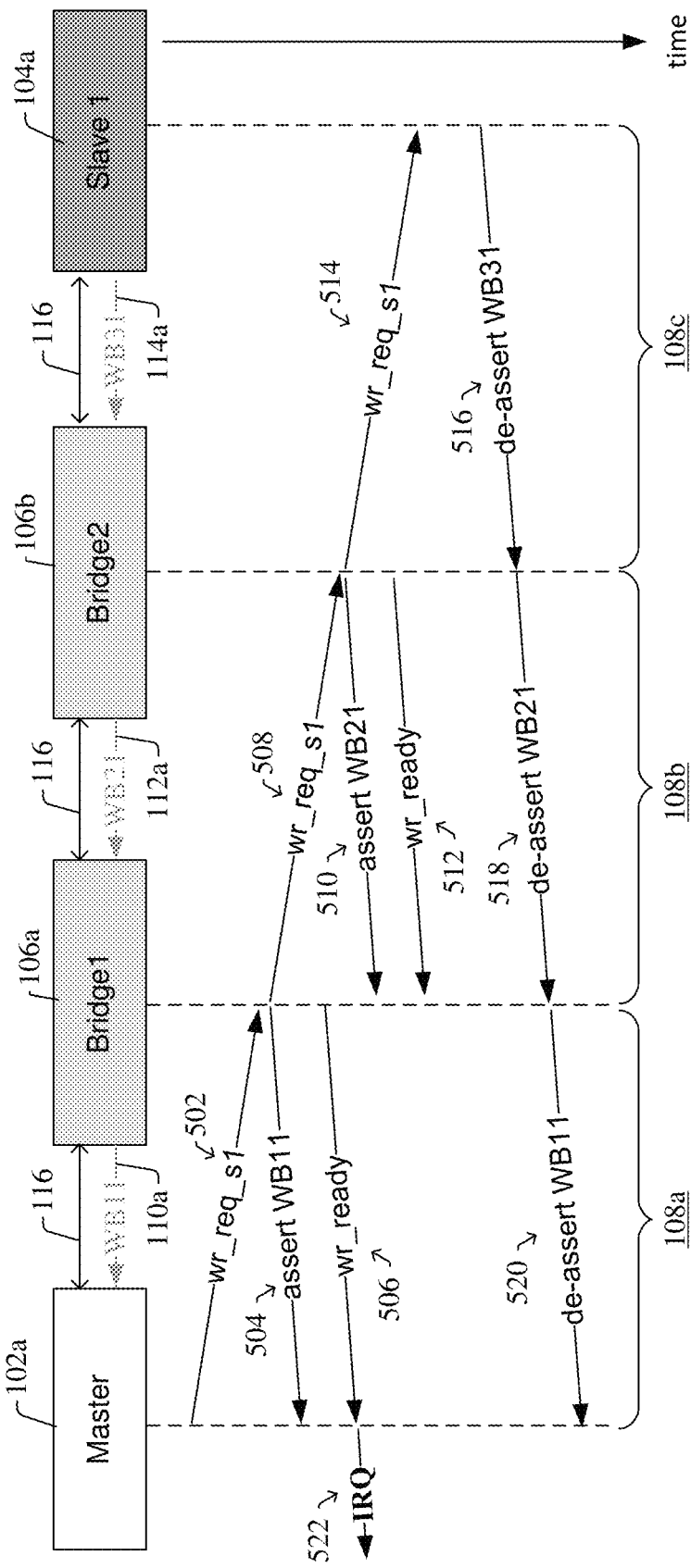
FIG. 5 illustrates a timing diagram that is consistent with some examples of FIG. 4.

An example of how write requests can be processed in FIG. 3's system 300 is now described with regards to the timing diagram of FIG. 5.

In FIG. 5, the master device 102a transmits a first write request (502) to the first slave device 104a by transmitting the address of the first slave over the data/control bus lines 116 of the first interface structure 108a. The first bridge device 106a accepts the first write request by asserting first first-interface write busy line WB11 (504), and also sends a wr_ready signal (506) back to the master device 102a. The wr_ready signal (506) is transmitted via the data/control bus lines 116 of the first interface structure 108a to indicate that the first bridge device 106a is ready to receive the data to be sent to the first slave device 104a.

At 508, the first bridge device 106a forwards the first write request to the second bridge device 106b by transmitting the address of the first slave over the data/control bus lines 116 of the second interface structure 108b. The second bridge device 106b accepts the first write request by asserting first second-interface write busy line WB21 (510), and also sends a wr_ready signal (512) back to the first bridge device 106a via the data/control bus lines 116 of the second interface structure 108b. This wr_ready signal 512 indicates that the second bridge device 106b is ready to receive the data to be sent to the first slave.

At 514, the second bridge device 106b then forwards the first write request to the first slave device 104a via data/control bus lines 116 of the third interface structure 108c. To acknowledge that the first slave device 104a has received the first write request, the first slave device 104a de-asserts the first third write busy slave signal WB31 (516), indicating that the first write request is pending at the first slave device 104a.

Upon receiving the de-assertion of the first third write busy slave signal WB31, the second bridge device 106b de-asserts the first second-interface write busy line WB21 (518). Upon receiving the de-assertion of the first second-interface write busy slave signal WB21, the first bridge device 106a de-asserts the first first-interface write busy line WB11 (520). Thus, the first first-interface write busy line WB11 stays continuously asserted from the time that the first bridge device 106a initially accepts the first write request (504) until the first bridge device 106a detects the de-assertion of the first first-interface write busy line WB11 (520), which indicates the first slave device 104a has received the first write request.

In some cases, a synchronization event 522, such as an interrupt or semaphore, can be triggered when the wr_ready signal is received at the master device 102a (at 506). Thus, at this time, the data may not yet have been written to the first slave device 104a because of delays due to the distributed nature of the interface structure. To ensure this condition does not cause synchronization issues, when evaluating the synchronization event 522, the system can evaluate the first first-interface write busy line WB11 520 (e.g., as part of the interrupt service routine or other mechanisms) to determine whether the first slave device 104a device has a write transaction pending. If a write transaction is still pending (e.g., if the first first-interface write busy line WB11 is still asserted), the system can take appropriate action (e.g., wait additional time until the first first-interface write busy line WB11 is de-asserted) to mitigate and/or prevent synchronization issues in the system. Thus, this write buys signaling limits or prevents data from being processed out of order or in an otherwise untimely manner.

Figure 6:
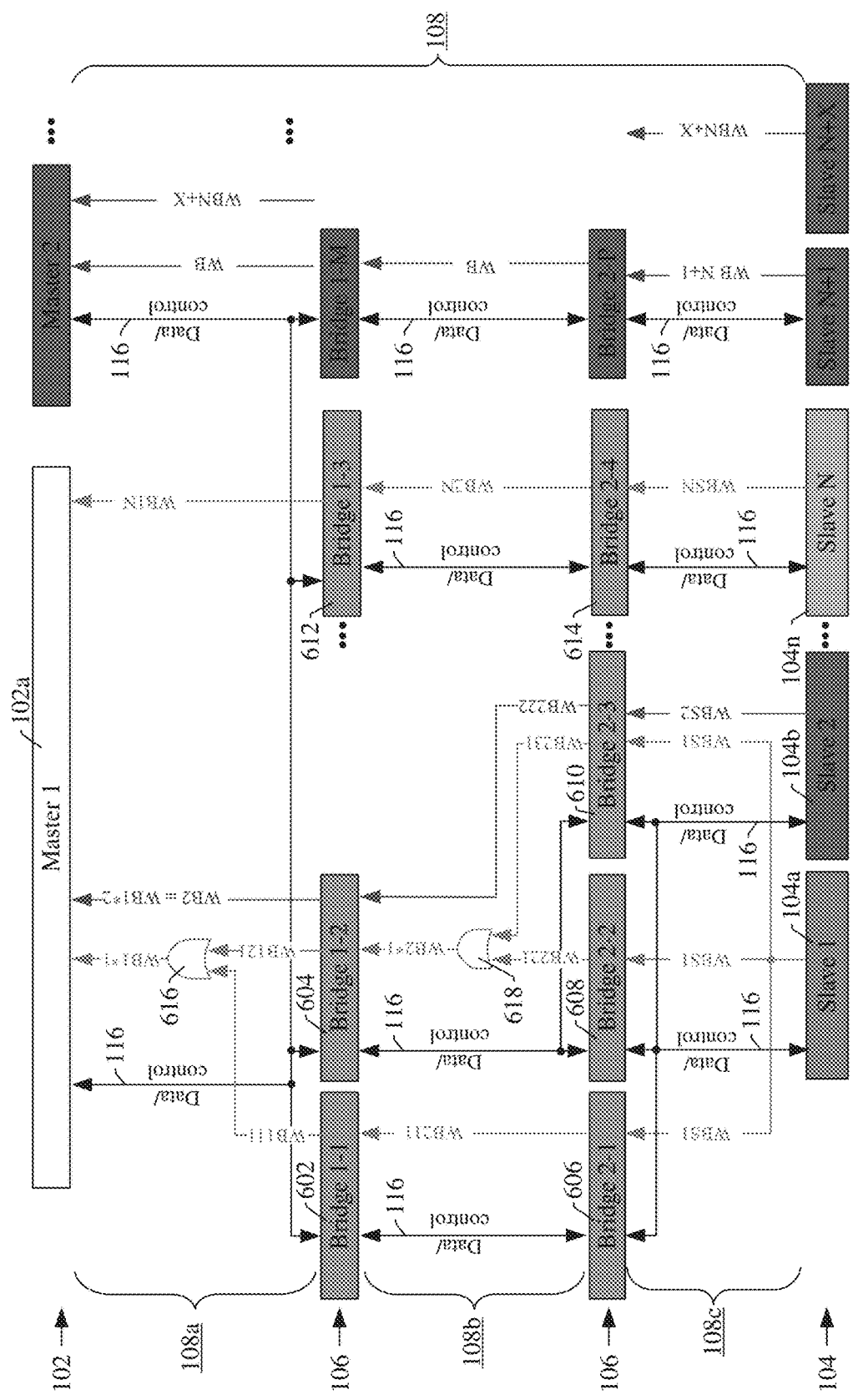
FIG. 6 illustrates a more detailed system including an interface structure in accordance with some embodiments.

Turning now to FIG. 6, one can see a more detailed implementation of a system 600 that includes some of the basic features of FIGS. 1-3, as well as other features. The system 600 again includes an interface structure 108 that couples one or more master devices 102 to a number of slave devices 104 through a plurality of bridge devices 106. Thus, in general, FIG. 6 illustrates a number of master devices 102 arranged at various points on a chip, a number of slave devices 104. Interface structures 108 are arranged between the master devices and slave devices, and bridge devices are arranged between the interface structures 108. The interface structures 108 do not necessarily connect the whole chip, and to get from one interface structure to another a bridge device is used. Moreover, the data/control bus lines 116 and the write back lines (e.g., WBS1, WBS2 . . . , WB1*2, etc.) represent physical connections (e.g., physical wiring in the chip) between the master devices 102, slave devices 104, and bridges devices 106. Thus, on a physical chip, the number of master devices, bridge devices, and slave devices is fixed, though any number of master devices, slave devices, and bridge devices (and any number of levels of bridge devices) could be included. However, logically speaking, the number of bridges between master and slave may vary in time, such that the logical communication path over the various bridges and interface structures may correspondingly vary between master device(s) and its/their corresponding slave device(s) in time. This approach provides flexible bandwidth and communication between the master devices and slave devices, but also can lead to synchronization issues but for the presence of the write back lines. Thus, the write back lines can help promote improved synchronization between the various components compared to conventional approaches.

In this example, the number of bridge devices allocated to each slave device can correspond to the bus bandwidth expected to be used by that slave device. Consider an example for FIG. 6 where the first slave device 104a is expected to consume a large bus bandwidth, the second slave device 104b is expected to consume a small bus bandwidth, and the Nth slave device 104n is expected to consume an intermediate bus bandwidth. To facilitate this bandwidth allocation, the number of bridge devices are allocated to follow these expected bus bandwidths. Thus, furthering this example, the first slave device 104a is allocated bridge devices 602, 604, 606, 608, and 610. This means that data write requests sent to the first slave device 104a from the first master device 102a use a communication path made of any combination of 602, 604, 606, 608, and 610. Further, write busy signals are propagated back from the first slave device 104a to the first master device 102 via write busy lines that pass through each of the bridge devices 602, 604, 606, 608, and 610. This effectively provides the first slave device 104a with a full dedicated communication path through 602 and 606, and a portion of a shared communication path through 604, 608, and 610 (this shared communication path being shared between the first and second slave devices 104a, 104b). The second slave device 104b is allocated only bridge devices 604 and 610, and because these are also shared with the first slave device 104a, the second slave device 104b receives considerably less bus bandwidth than the first slave device 104a. Write busy signals are propagated back from the second slave device 104b to the first master device 102a via write busy lines that pass through only the bridge devices 604 and 610. Regarding the Nth slave device 104n, bridge devices 612 and 614 are each fully allocated to the Nth slave device 104n, so the Nth slave device has an intermediate bus bandwidth. Write busy signals are propagated back from the Nth slave device 104n to the first master device 102 via write busy lines that pass through only the bridge devices 612 and 614.

The bridge devices have individualized address detection and routing circuitry that routes the various write requests through the predetermined communication path options to the various slaves. For example, as described above, the first slave device 104a receives write requests through a communication path including some combination of bridge 1-1 602, bridge 1-2 604, bridge 2-1 606, bridge 2-2 608, and bridge 2-3 610, which have address detection circuitry that identifies the write request is intended for the first slave device 104a and activate accordingly. Exactly what combination of bridge 1-1 602, bridge 1-2 604, bridge 2-1 606, bridge 2-2 608, and bridge 2-3 610 are included for the communication path depends on which of those bridge devices are currently available, and can vary dynamically during operation. Similarly, with regards to the second slave device 104b, bridge 1-2 604 and bridge 2-3 610 have address detection and routing circuitry to identify a second write request is intended for the second slave device 104b and activate accordingly, and other bridge devices 602, 606, 608, 612, 614 do not activate and/or pass the second write request. With regards to the Nth slave device 104n, bridge 1-3 612 and bridge 2-4 614 have address detection and routing circuitry that route the Nth write transaction through this communication path (and not through other bridge devices 602, 604, 606, 608, 610).

Thus, in some cases, the first slave device 104a is coupled to the first master device 102a via a first bridge device (e.g., bridge 2-1) and a second bridge device (e.g., Bridge 2-3), and the second slave device 104b is coupled to the first master device 102a via the second bridge device (e.g., Bridge 2-3) but not via the first bridge device (e.g., not via bridge 2-1). This selective sharing of bandwidth, which can be implemented in the address decoding hardware of the bridge devices, is advantageous because it allows the various slaves to have pre-determined bus bandwidths that are different from one another and that follow the expected bus bandwidth to be consumed by the various slave devices. Also, because the data/control bus lines 116 for a given bridge device feed the various downstream devices from that given bridge, this approach also conserves wiring somewhat. For example, data/control bus lines 116 downstream of bridge 1-1 are coupled to bridge 2-1, and are coupled to first slave device 104a (through bridge 2-1), but are not coupled to slave N. Similarly, data/control bus lines 116 downstream of bridge 1-2 are coupled to bridge 2-2 and bridge 2-3, and to the first and second slave devices 104a, 104b (via bridge 2-2 and bridge 2-3), but are not coupled to slave N. Thus, write requests can be transmitted from the master device to the various slave devices over the data/control bus lines 116, which specify target addresses and which are decoded by the various bridge devices to intelligently pass on the write requests.

To limit and/or prevent synchronization issues, the interface structure 108 again includes write busy lines that are separate from the data/control bus lines 116. In particular, the master device includes a first first-interface write busy line WB1*1 corresponding to the first slave device 104a, a first second-interface write busy line WB1*2 corresponding to the second slave device 104b, . . . , and a first Nth write busy line WB1N corresponding to the Nth slave 104n. When multiple bridge devices at a given bridge level are allocated to a slave device, the interface structure may include a logical-or circuit (e.g., 616, 618) to consolidate the write busy lines and enable desired functionality. Further, in the embodiment of FIG. 6, the slave devices 104a-104n also include write busy lines (e.g., WBS1-WBSN, respectively) that are separate from the data/control bus lines 116 within the third interface structure 108c, and which are selectively de-asserted when the corresponding slave device accepts a write transaction on the interface structure 108.

Thus, for each slave, the interface structure 108 routes a write transaction from the master device to a corresponding slave device through an available bridge that has been allocated to the slave device at each bridge level. So for example, to write to the first slave device 104a, an allocated first-level bridge (e.g., Bridge 1-1 or Bridge 1-2) accepts the write request and sets a write busy signal (e.g., WB111 or WB121, respectively), thereby triggering the assertion of the first first-interface write busy line WB1*1 at the master device by OR-gate 616 in the first interface structure 108a. The first level bridge that accepted the write request then forwards the write request to the second level of bridges to which it is coupled. So for example, if bridge 1-2 accepts the write request, it would forward the write request to bridge 2-2 and bridge 2-3 using the data/control bus lines 116 of the second interface structure 108b. Upon the second level of bridges accepting the write request, the request is forwarded to the relevant slave device. So for example, if bridge 2-2 receives the write request for first slave device 104a, it forwards the write request via data/control bus lines 116 of third interface structure 108c. When the first slave receives the write request, it de-asserts write busy line WBS1, which then in turn de-asserts WB211 and/or WB2*1 (via WB211 and/or WB231 through OR-gate 518), which in turn de-asserts WB1*1 (via WB111 and/or WB121 through OR-gate 616). Thus, in response to the first bridge (e.g., Bridge 1-2) setting its corresponding write busy signal (e.g., WB121), the second bridge (e.g., Bridge 2-2) holds the set write busy signal until the write transaction has been received by the slave device; and upon the slave device receiving the write transaction, the second bridge (e.g., Bridge 2-2) resets the write busy signal (e.g., WB221) to propagate the reset write busy signal (e.g., WB121) back to the master device through the first bridge (e.g., Bridge 1-2).

Figure 7:
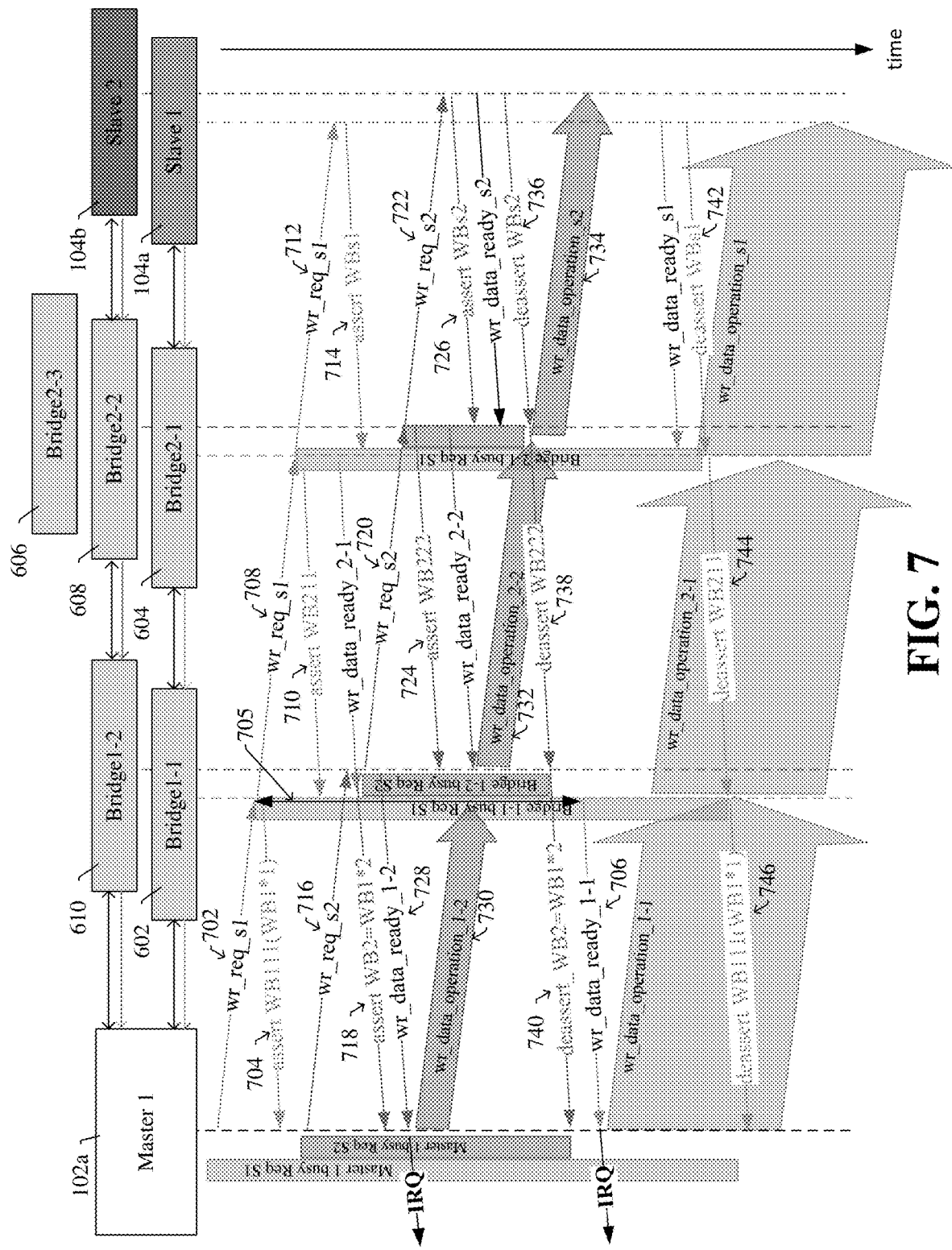
FIG. 7 illustrates a timing diagram that is consistent with some examples of FIG. 6.

An example of how write requests can be processed in system 600 is now described with regards to the timing diagram of FIG. 7. It will be appreciated that FIG. 7 illustrates a case where write operations are interleaved with one another in that the master device makes a first write request to a first slave device, than while that write request is pending in the interface, the master device makes a second write request to a second slave device. In other cases, however, interleaved writes may not occur, and thus although FIGS. 6-7 are referred to concurrently below it will be appreciated that FIG. 7 is merely one non-limiting example of how the system 600 of FIG. 6 may function.

In FIG. 7, the first master device 102a makes a first write request (702) to the first slave device 104a. For purposes of explanation in this example, we presume Bridge 1-1 602 claims the first write request, hence Bridge 1-1 602 accepts the first write request by asserting WB111 (704), which also causes first first-interface write busy line WB1*1 to be asserted due to OR-gate 616 (see FIG. 6). However, in this example Bridge 1-1 is not yet ready to receive data, so there is a long delay 705 before Bridge 1-1 602 asserts the wr_data_ready_1-1 signal (706), where assertion of the wr_data_ready signal at 706 indicates Bridge 1-1 is in fact ready to receive data. Nonetheless, during the delay 705 Bridge 1-1 forwards the first write transaction (708) to the next level of bridges, at which point Bridge 2-1 604 claims the first write request and asserts the first second-interface write busy line WB211 (710). Bridge 2-1 604 then forwards the first write request to the first slave device 104a (712), and the first slave device 104a asserts the first write busy slave signal WBS1 (714), indicating that a write transaction is pending at the first slave device 104a.

During the delay 705 while Bridge 1-1 602 is still preparing to receive data, the first master device 102a makes a second write request (716) to the second slave device 104b. In this example, Bridge 1-2 610 claims the second write request, hence Bridge 1-2 asserts second first-interface write busy line WB1*2 718. Bridge 1-2 610 also forwards along the second write request to Bridge 2-2 608 (720), which in turn forwards the second write request to the second slave device 104b (722). Bridge 2-2 608 and second slave device 104b assert their write busy lines (see 724 and 726) in response to accepting the second write request. Further, because Bridge 1-2 610 is ready to receive data, Bridge 1-2 also asserts wr_data_ready_1-2 signal (728). In response to receiving the wr_data_read_1-2 signal 728, the master device 102a transmits data to Bridge 1-2 in 730, and this data is then passed down from the various bridges in 732 and 734 when it is written to the first slave 104a.

For a slave device to accept a write request (which can occur well before data is written to the slave device, due to delays in the interface structure), the slave de-asserts its write busy line. Thus, when the second slave 104b accepts the second write request, the second slave de-asserts the second third-interface write busy line at 736. Upon receiving the de-assertion of the second third-interface write busy slave signal, bridge device 2-2 608b de-asserts the second second-interface write busy line WB222 (738). Upon receiving the de-assertion of the second second-interface write busy slave signal WB222, the bridge device 1-2 610 de-asserts the second first-interface write busy line WB2=WB1*2 (740). Thus, the second first-interface write busy line stays continuously asserted from the time that bridge 1-2 initially accepts the second write request (716) until bridge device 1-2 detects the de-assertion of the second first-interface write busy line (740), which indicates the second slave device 104a has received the second write request. Similarly functionality occurs when the first slave device 104a accepts the first write request (see 742, 744, 746).

Figure 8:
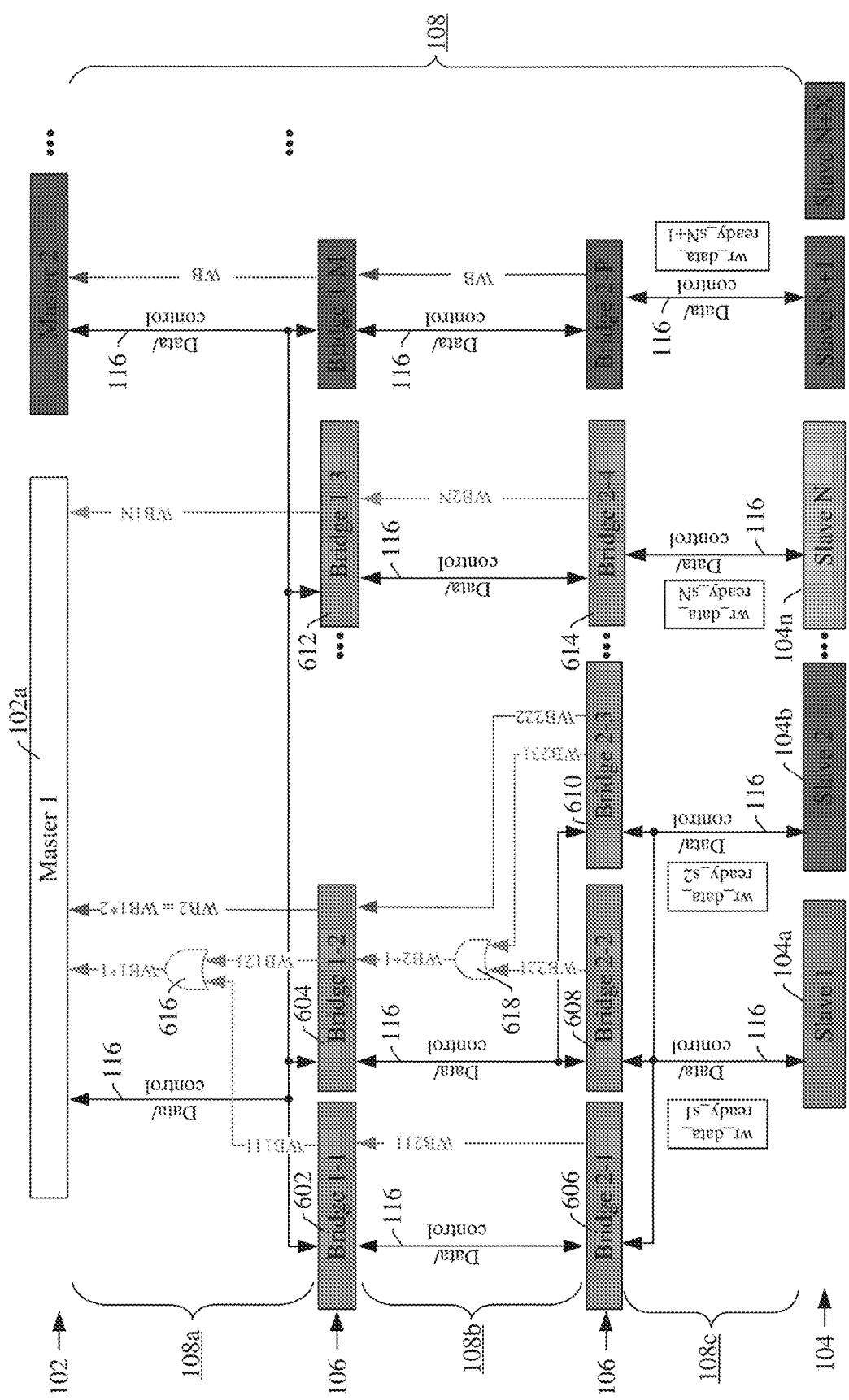
FIG. 8 illustrates a more detailed system including an interface structure in accordance with some embodiments.

FIG. 8 illustrates another embodiment that is similar in many regards to FIG. 7. However, in FIG. 8 the third interface structure 108c includes the same set of data/control bus lines 116 but does not include any dedicated write busy lines. So in FIG. 8's embodiment, the wr-data-ready signal from a slave is simply transmitted over the data/control bus lines (e.g., as a logical signal) without dedicated/separate physical write busy lines from the corresponding slaves. Thus, in FIG. 8, the second level of Bridges (e.g., Bridge 2-1, Bridge 2-2, Bridge 2-3, and so on) have logic circuitry to evaluate the signals on the data/control bus lines 116 to determine when a slave device has received a write request, and then de-asserts the corresponding write-busy lines in the second interface structure 108b (e.g., WB211, WB222, WB221, and so on). The de-asserted write busy signals can then be propagated to the master device 102a as previously discussed to notify the master of when a slave device has accepted a write request.

Figure 9:
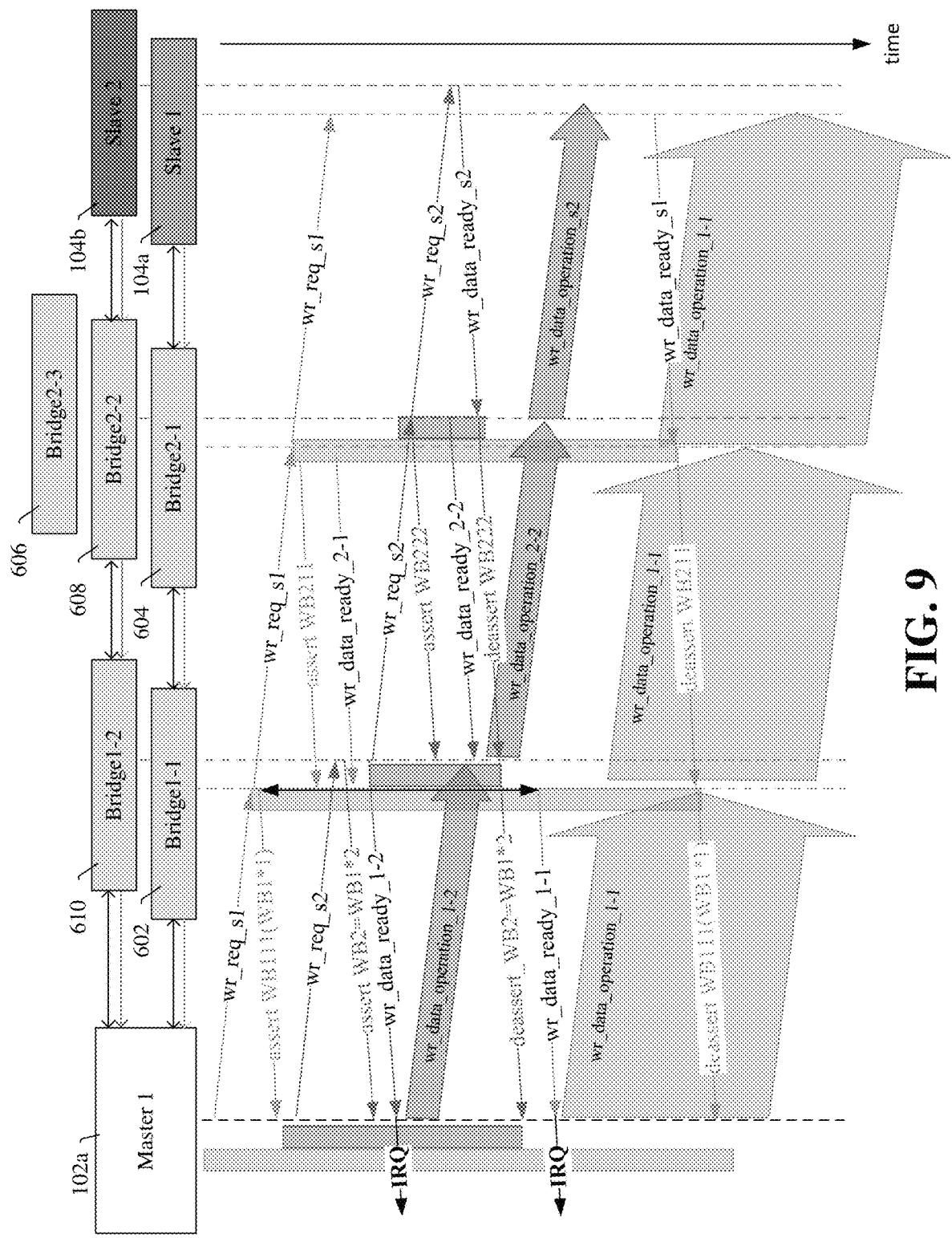
FIG. 9 illustrates a timing diagram that is consistent with some examples of FIG. 8.

An example of how write requests can be processed in system 800 is now described with regards to the timing diagram of FIG. 9. It will be appreciated that FIG. 9 illustrates a case where write operations are interleaved with one another in that the master device makes a first write request to a first slave, than while that write request is pending in the interface, the master device makes a second write request to a second slave device. In other cases, however, interleaved writes may not occur, and thus although FIGS. 8-9 are referred to concurrently below it will be appreciated that FIG. 9 is merely one non-limiting example of how the system 800 of FIG. 8 may function.

Again, in FIG. 9, rather than separate write busy lines being asserted and/or de-asserted from the respective slave devices, the slave devices transmit a wr_data_ready signal that indicates they are ready to receive data over the data/control bus lines 116, and the second-level bridges translate the wr_data_ready signals to correspondingly de-assert the write busy lines.

FIG. 10 illustrates a method 1000 in flow chart format in accordance with some embodiments.

Method 1000 begins at act 1002, where a write transaction is routed from a master device to a slave device through a communication path including a first bridge and a second bridge downstream of the first bridge. The first bridge and the second bridge are coupled to one another via an interface structure.

In act 1004, the first bridge sets a write busy signal on the communication path when the write transaction is processed by the first bridge. In response to the first bridge setting the write busy signal, the second bridge holds the write busy signal set until the write transaction has been correctly received by the slave device.

In act 1006, upon the slave device correctly receiving the write transaction, the second bridge resets the write busy signal to propagate the reset write completion signal back to the master device through the first bridge.

It will be appreciated that the terms "first", "second", "third", "fourth", and the like are merely generic identifiers and, as such, may be interchanged in various embodiments. For example, while an element (e.g., a slave) may be referred to as a "first" element in some embodiments, the element may be referred to as a "second" element in other embodiments, a "third" elements in still other embodiments and so on, and thus, these generic identifiers can be switched and/or transposed between various embodiments in any number of permutations that fall within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method, comprising:
routing a write transaction from a master device to a slave device through a communication path, the communication path including a first bridge and a second bridge downstream of the first bridge, wherein the first bridge and the second bridge are coupled to one another via an interface structure,
wherein the first bridge sets a write busy signal on the communication path when the write transaction is processed by the first bridge; and in response to the first bridge setting the write busy signal, the second bridge holds the write busy signal set until the write transaction has been received by the slave device;
upon the slave device receiving the write transaction, the second bridge resets the write busy signal to propagate the reset write busy signal back to the master device through the first bridge;
providing a write ready signal from the first bridge when the first bridge is ready to receive data from the master device; and
triggering a synchronization event when the master device receives the write ready signal.

2. The method of claim 1, wherein the synchronization event is triggered before the data has been fully written to the slave device.

3. The method of claim 2, wherein the synchronization event is responded to by checking whether the write busy signal is set or reset.

4. A system, comprising:
a master device;
a first bridge device coupled to the master device via a first interface structure, the first interface structure including a first first-interface write busy line;
a first slave device coupled to the first bridge device via a second interface structure, the second interface structure including a first second-interface write busy line;
wherein, upon a first write request from the master device to the first slave device through the first bridge device, the first bridge device is configured to assert the first first-interface write busy line; and
wherein, upon the first slave device accepting the first write request, the first slave device is configured to trigger de-assertion of the first second-interface write busy line, and the first bridge device is configured to de-assert the first first-interface write busy line in response to the de-assertion of the first second-interface write busy line;
a second slave device;
wherein the first interface structure includes a second first-interface write busy line that is distinct from the first first-interface write busy line and that corresponds to the second slave device;
wherein the second slave device is coupled to the first bridge device via the second interface structure, the second interface structure including a second second-interface write busy line that is distinct from the first second-interface write busy line, the second second-interface write busy line corresponding to the second slave device.

5. The system of claim 4, further comprising:
a second bridge device coupled to the master device via the first interface structure, the second bridge device coupling the second slave device to the master device.

6. The system of claim 4, wherein, upon a second write request from the master device to the second slave device through the first bridge device, the first bridge device is configured to assert the second first-interface write busy line; and
wherein, upon the second slave device accepting the second write request, the second slave device is configured to trigger de-assertion of the second second-interface write busy line, and the first bridge device is configured to de-assert the second first-interface write busy line in response to the de-assertion of the second second-interface write busy line.

7. A system, comprising:
a master device;
a first bridge device coupled to the master device via a first interface structure, the first interface structure including a first first-interface write busy line;
a first slave device coupled to the first bridge device via a second interface structure, the second interface structure including a first second-interface write busy line;
wherein, upon a first write request from the master device to the first slave device through the first bridge device, the first bridge device is configured to assert the first first-interface write busy line;
wherein, upon the first slave device accepting the first write request, the first slave device is configured to trigger de-assertion of the first second-interface write busy line, and the first bridge device is configured to de-assert the first first-interface write busy line in response to the de-assertion of the first second-interface write busy line; and
a second bridge device coupled between the first bridge device and the first slave device, the second bridge device coupled to the first bridge device via the second interface structure and coupled to the first slave device via a third interface structure.

8. The system of claim 7, wherein the third interface structure includes a first third-interface write busy line, and
wherein, upon the first slave device accepting the first write request, the first slave device is configured to de-assert the first third-interface write busy line, the second bridge device is configured to de-assert the first second-interface write busy line in response to the de-assertion of the first third-interface write busy line, and the first bridge device is configured to de-assert the first first-interface write busy line in response to the de-assertion of the first second-interface write busy line.

9. The system of claim 7, wherein the first slave device is coupled to the master device via the first bridge device and the second bridge device, and further comprising:
a second slave device coupled to the master device via the second bridge device but not via the first bridge device.

10. The system of claim 7, further comprising a second slave device coupled to the master device via the first interface structure, the second interface structure, and the third interface structure;
wherein the first interface structure includes a second first-interface write busy line, the second interface structure includes a second second-interface write busy line, and the third interface structure includes a second third-interface write busy line;
wherein the second first-interface write busy line, the second second-interface write busy line, and the second third-interface write busy line correspond to the second slave device.

11. The system of claim 10,
wherein, upon the second slave device accepting a second write request, the second slave device is configured to trigger de-assertion of the second third-interface write busy line, the second bridge device is configured to de-assert the second second-interface write busy line in response to the de-assertion of the second third-interface write busy line, and the first bridge device is configured to de-assert the second first-interface write busy line in response to the de-assertion of the second second-interface write busy line.

12. The system of claim 7, wherein the second bridge device includes logic circuitry configured to de-assert the first second-interface write busy line in response to a data_write_ready signal from the first slave device without having a separate write busy write line being directly coupled to the first slave device.

13. The system of claim 9, wherein the first interface structure includes a set of data/control bus lines and the first first-interface write busy line, the second interface structure includes the same set of data and control lines and the first second-interface write busy line, and the third interface structure includes the same set of data and control lines but does not include an interface write busy line.

14. The system of claim 4, wherein the master device, the first bridge device, and the first slave device are disposed in a single integrated circuit package.

15. A system, comprising:
a master device;
a first level of bridge devices coupled to the master device via a first interface structure, the first interface structure including N write busy bus lines, wherein N is two or more and each of the N write busy bus lines are coupled directly to the master device;
a second level of bridge devices coupled to the first level of bridge devices via a second interface structure; and
N slave devices coupled to the second level of bridge devices via a third interface structure, wherein the N slave devices have a one-to-one correspondence with the N write busy bus lines.

16. The system of claim 15, wherein the master device is configured to write data to a first slave device via a communication path including at least a first bridge device in the first level of bridge devices and multiple bridge devices in the second level of bridge devices.

17. The system of claim 16, wherein the first slave device is coupled to each of the multiple bridge devices in the second level of bridge devices via a write-busy bus line.

18. The system of claim 17, wherein the second interface structure includes a logical-OR circuit that receives multiple write busy signals from the multiple bridge devices, respectively, in the second level of bridge devices, and provides a single write busy signal to the first bridge device in the first level of bridge devices based on the received multiple write busy signals.

19. The system of claim 18, wherein the multiple write busy signals correspond to the first slave device.

20. A system, comprising:
- a master device;
- a first level of bridge devices coupled to the master device via a first interface structure, the first interface structure including N write busy bus lines, wherein N is a first integer;
- a second level of bridge devices coupled to the first level of bridge devices via a second interface structure; and
- N slave devices coupled to the second level of bridge devices via a third interface structure, wherein the N slave devices have a one-to-one correspondence with the N write busy bus lines;

wherein the first interface structure comprises:
- a read/write bus line on which a read/write signal is provided from the master device to the N slave devices;
- K address bus lines on which an address signal is provided, wherein K is a second integer and wherein $2^K$ corresponds to an address space available to devices on the first interface structure;
- M data bus lines on which a data signal provided, wherein M is a third integer; and
- wherein the N write busy bus lines on which N write busy signals are provided are separate from the read/write bus line, the K address bus lines, and the M data bus lines.

* * * * *